Patented Oct. 29, 1940

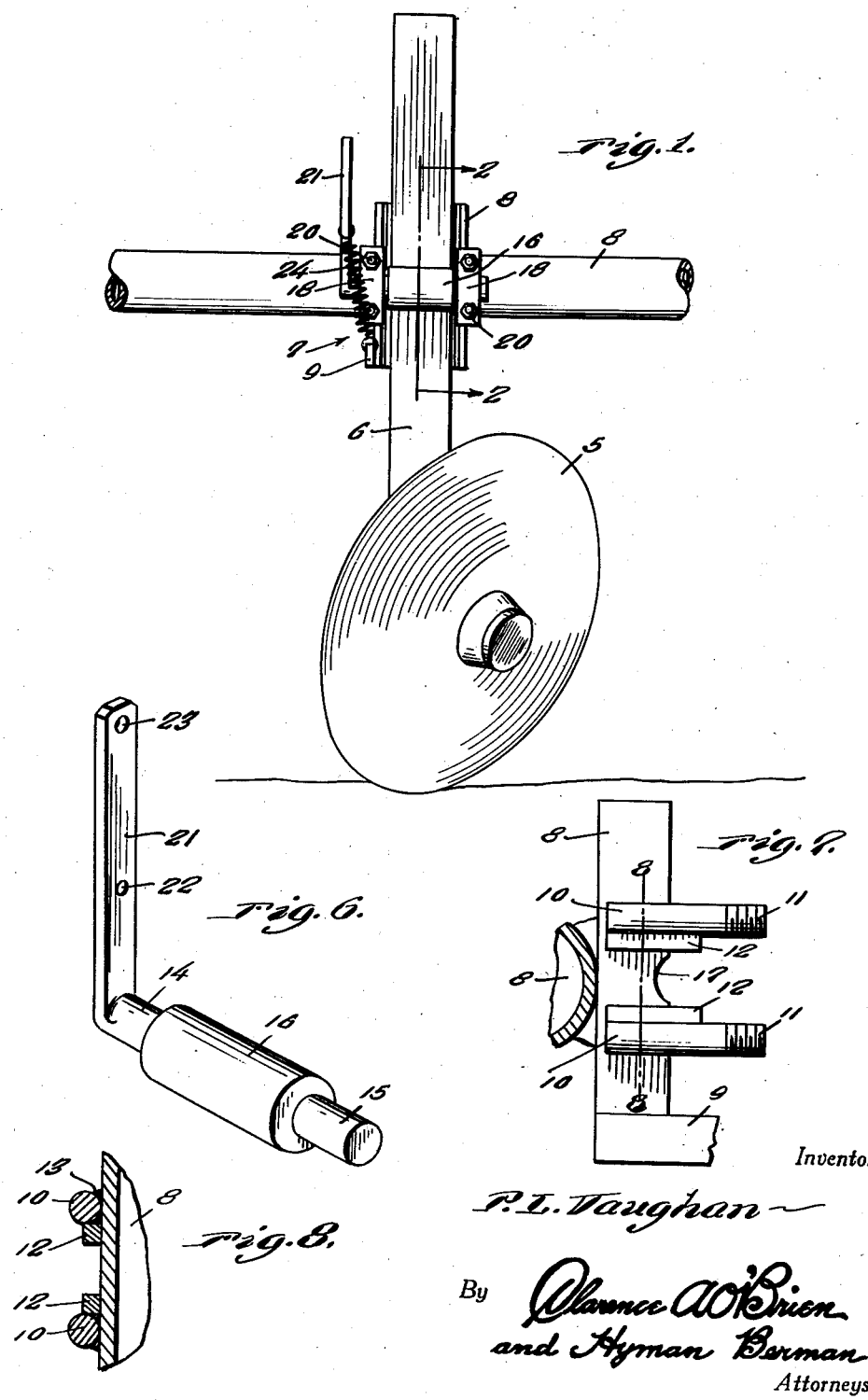

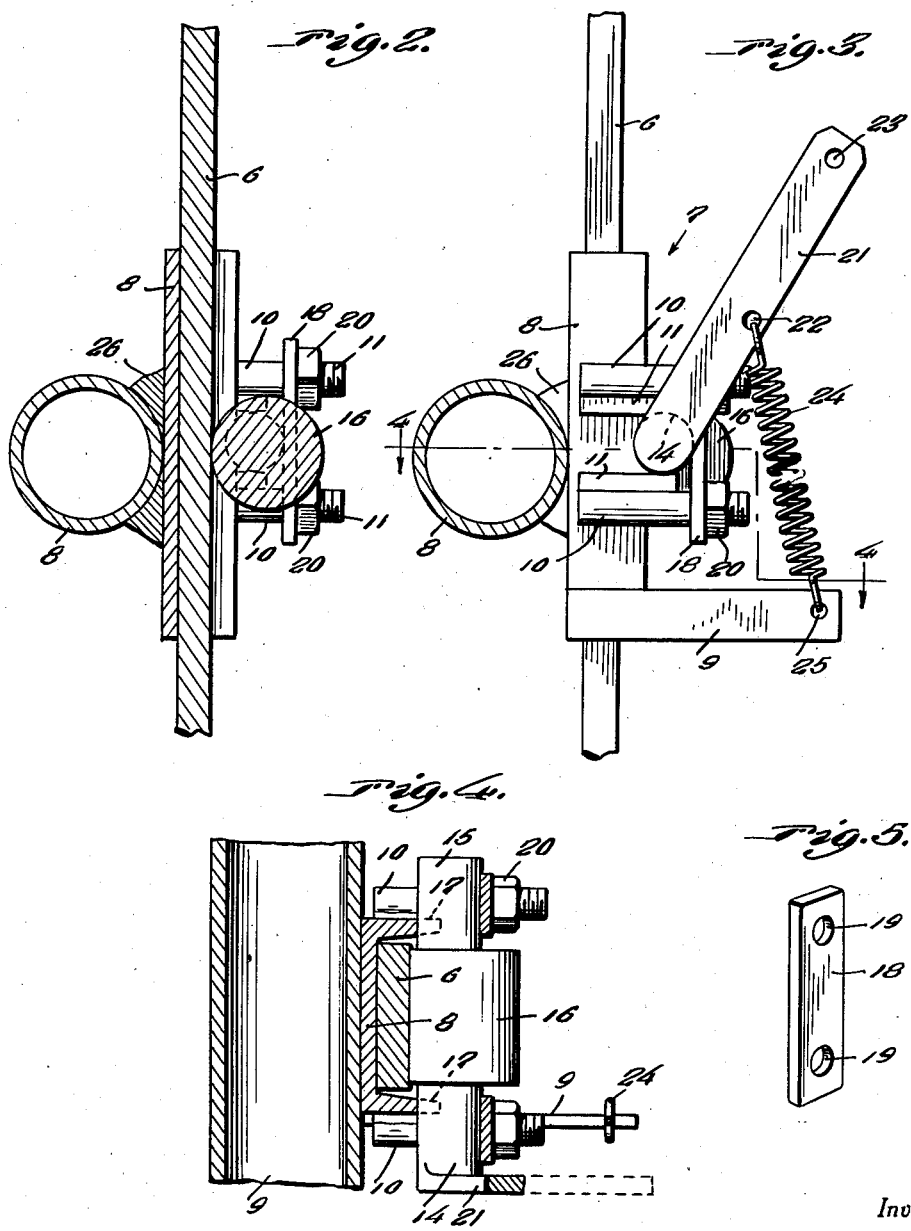

2,219,969

UNITED STATES PATENT OFFICE 2,219,969

HOLDER

Paschal L. Vaughan, Kingsburg, Calif.

Application December 27, 1939, Serial No. 311,213

3 Claims. (Cl. 24—243)

This invention appertains to new and useful improvements in clamp type holders and more particularly to a holder for holding agricultural implements.

The principal object of the present invention is to provide an implement holder especially adapted for holding implements such as disks, scrapers and the like at the desired elevation.

Another important object of the invention is to provide a holder for various types of implements which is designed to more fastly hold the implement when subjected to force.

Still another important object of the invention is to provide a clamp holder for implements of the character stated which while firmly holding the implement, can at the same time be easily released for repair or replacement of the held implement.

These and other objects and advantages of the invention will become apparent to the reader of the following specification.

In the drawings:

Figure 1 is a rear elevational view of the holder showing the same holding an agricultural disc.

Figure 2 is a section on the line 2—2 of Figure 1.

Figure 3 is a fragmentary side elevational view of the holder.

Figure 4 is a section on the line 4—4 of Figure 3.

Figure 5 is a perspective view of one of the bridge members.

Figure 6 is a perspective view of the cam unit.

Figure 7 is a fragmentary side elevational view of the frame of the holder with the cam removed.

Figure 8 is a section on the line 8—8 of Figure 7.

Referring to the drawings wherein like numerals designate like parts, it can be seen in Figure 1 that numeral 5 represents a disc of an agricultural machine, or in fact it can be some other form of implement having a shank 6. Numeral 7 generally refers to the holder. Numeral 8 is the usual cross-bar for holding the implement.

In carrying out the present invention, the holder 7 consists in construction of a channeled member 8 having an arm extending rearwardly from one flange thereof in a horizontal direction.

Stud bolts 10—10 also extend rearwardly from the same flange of the channeled member 8 in a rearward direction and in parallel spaced relation. These stud bolts are located above the arm 9 and are threaded at their rear ends as at 11.

Reinforcing blocks 12 are placed one below the upper stud bolt 10 and the other above the stud bolt 10 and these blocks 12 and stud bolts 10 are welded together and to the channeled member 8 as at 13.

The blocks 12 extend sufficiently in a rearward direction to act as bearing blocks for the trunnions 14—15 of the cam roller 16. Each of the flanges of the channeled member 8 is recessed as at 17 between the blocks 12, thus affording a further bearing surface for the trunnions 14 and 15.

Of course, the cam roller 16 is set between the flanges of the channeled member 8 so that the trunnions 14 and 15 project beyond the sides of the same.

For each pair of vertically spaced stud bolts 10 there is a bridge member 18 having openings 19 at the upper and lower ends thereof to receive the threaded ends of the said stud bolts and nuts 20 are provided on these stud bolts and are feedable against the bridge members 18 to place the proper tension on the trunnions 14 and 15, it being preferable that the bridge members or straps 18 be of spring steel.

To maintain the roller 16 rocked to the position where it will have camming effect on the implement shank 6 an arm 21 is provided for the same and projects from the trunnion 14. This arm 21 can have several openings 22 therein into which one end of the tension spring 24 can engage, while the other end engages through an opening 25 in the outer end of the aforementioned arm 9.

Whenever the tool shank 6 is to be released, the arm 21 can be swung upwardly, putting the spring 24 under tension, but rotating the cam roller 16 to a position where the shank 6 will be released and can drop from the holder.

As shown in Figures 2 and 3, the forward side of the channeled member 8 is welded as at 26 to the supporting bar 8.

Obviously the principal aim of this invention is to replace old types of holding devices such as employ notches, combs, clamps, ratchets, gears, etc. Obviously, the device can be modified in certain ways by reversing the spring etc. to serve other purposes. Furthermore, the device can be used on cylinders as well as flat surfaces, and furthermore, the device can be used in multiples, that is, in opposed relation.

While the foregoing specification sets forth the invention in specific terms, it is to be understood that numerous changes in the shape, size and materials may be restored to without departing from the spirit and scope of the invention as claimed hereinafter.

Having described the invention, what is claimed as new is:

1. A holder of the character described comprising a channeled member, a pair of threaded members extending from each of the side flanges of the channel member, a cam having trunnions, said cam being partly disposed into the channeled member and having its trunnions extending between the pairs of threaded members, bridge members bridging the threaded members and to partly act as bearings for the trunnions, nuts on the threaded members to prevent displacement of the bridge members, and means for rotating the cam.

2. A holder of the character described comprising a channeled member, a pair of threaded members extending from each of the side flanges of the channeled member, a cam having trunnions, said cam being partly disposed into the channeled member and having its trunnions extending between the pairs of threaded members, bridge members bridging the threaded members and to partly act as bearings for the trunnions, nuts on the threaded members to prevent displacement of the bridge members, and means for rotating the cam, said means for rotating the cam consisting of an arm on one of the trunnions, and means for holding the arm in one direction maintaining the cam set toward the back of the channeled member.

3. A holder of the character described comprising a channel member, a pair of threaded members extending from each of the side flanges of the channeled member, a cam having trunnions, said cam being partly disposed into the channeled member and having its trunnions extending between the pairs of threaded members, bridge members bridging the threaded members and to partly act as bearings for the trunnions, nuts on the threaded members to prevent displacement of the bridge members, and means for rotating the cam, said means for rotating the cam consisting of an arm on one of the trunnions, and means for holding the arm in one direction maintaining the cam set toward the back of the channeled member, said means for holding the arm consisting of a fixed arm on the lower portion of the channel member, and a tension spring having one end connected to the first mentioned arm and its other end fastened to the fixed arm.

PASCHAL L. VAUGHAN.